US008462828B1

(12) United States Patent
Estes

(10) Patent No.: US 8,462,828 B1
(45) Date of Patent: Jun. 11, 2013

(54) SYSTEM FOR GENERATING COHERENT SINGLE-FREQUENCY SINGLE TRANSVERSE MODE LIGHT PULSES

(75) Inventor: Lee E. Estes, Mattapoisett, MA (US)

(73) Assignee: The United States of Americas as represented by the Secretary of the Navy, Washington, DC (US)

( * ) Notice: Subject to any disclaimer, the term of this patent is extended or adjusted under 35 U.S.C. 154(b) by 200 days.

(21) Appl. No.: 13/040,995

(22) Filed: Mar. 4, 2011

(51) Int. Cl.
*H01S 3/08* (2006.01)
(52) U.S. Cl.
USPC .......................................................... 372/106
(58) Field of Classification Search
USPC ................................. 372/3, 6, 38.02, 106, 25
See application file for complete search history.

(56) References Cited

U.S. PATENT DOCUMENTS 6,404,538 B1 * 6/2002 Chen et al. .................... 359/323

* cited by examiner

*Primary Examiner* — Jessica Stultz
*Assistant Examiner* — Tuan Nguyen
(74) *Attorney, Agent, or Firm* — James M. Kasischke; Michael P. Stanley; Jean-Paul A. Nasser

(57) ABSTRACT

A system is provided to generate coherent single-frequency and single transverse mode light pulses. A laser produces a linearly-polarized continuous wave beam defined by a single longitudinal and transverse mode. A first rotator processes the beam such that optical polarization is rotated during a first time period and not rotated during a second and third time period. A second rotator is operated during the first period to rotate optical polarization of the beam, during the second period to not rotate the beam, and during the third period to rotate the beam. An optical loop amplifies the beam during the first and second periods. An amplifier device can be added to the loop for amplification. A first beam splitter allows the beam to enter the loop and a second splitter directs the beam along the loop during the first and second periods and out of the loop during the third period.

2 Claims, 3 Drawing Sheets

US 8,462,828 B1

SYSTEM FOR GENERATING COHERENT SINGLE-FREQUENCY SINGLE TRANSVERSE MODE LIGHT PULSES

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The present invention relates generally to amplification of laser beams, and more particularly to a system that can generate high-power, coherent, single-frequency and single transverse mode light pulses using a low power laser.

(2) Description of the Prior Art

A variety of laser applications such as remote sensing of the environment require the use of a sequence of high-power, single-frequency, single transverse mode laser pulses. Often, several pulses in a sequence are required to have the same frequencies and transverse mode structures. The same frequency and transverse mode structure is crucial to the performance of systems that involve interferometry between signals that are generated by different pulses.

Current systems attempt to achieve the single transverse mode requirement by design of the generating laser cavity. The control and matching of the frequency is generally achieved by using a low-power, continuous-wave, single-frequency laser to seed the cavity of a Q-switched pulse laser.

The laser cavity design comprises one mirror of the pulsed laser cavity attached to a piezoelectric mount that can be repositioned with the application of a control voltage. A control circuit is used to adjust the piezoelectric mount such that the frequency of the laser pulse is adjusted to be a controllable frequency difference from the seed laser pulse beam. This is achieved by taking advantage of the fact that the build-up time of the laser pulse depends on the difference between the seed laser beam frequency and the nearest piezoelectrically-controlled resonant frequency of the pulsed cavity.

The pulse build-up time is a minimum when the resonant frequency of the pulsed cavity laser is equal to the frequency of the seed laser beam. The control circuit works by altering the position of the piezoelectrically-controlled mirror laser by a small distance to either side of the matched frequency mirror position. Measurements of the pulse build-up time are made for pulses generated with the mirror on both sides of the frequency matching position. The differences in pulse build-up are used to correct any position errors.

When the pulsed laser is activated, a search procedure is used to establish the desired operating point. While the result is the generation of a sequence of high-power light pulses that have frequencies with known variations on either side of the seed laser beam; the alteration rate must be suitable to keep up with the cavity drifts caused by temperature variations and slow drifts in the seed beam frequency.

SUMMARY OF THE INVENTION

Accordingly, it is a primary object and general purpose of the present invention to provide a system for generating single-frequency, single transverse mode light pulses.

It is a further object of the present invention to provide a system for using a low-power laser to generate high-amplitude, single-frequency, single transverse mode light pulses.

Other objects and advantages of the present invention will become more obvious hereinafter in the specification and drawings.

In accordance with the present invention, a system is provided for generating coherent single-frequency and single transverse mode light pulses. A laser of the system produces a linearly-polarized continuous wave laser beam defined by a single frequency and a single transverse mode.

A first polarization rotator is positioned to receive and process the laser beam. The first polarization rotator is operated during a first time period to rotate optical polarization of the laser beam. The first polarization rotator is operated during a second time period and a third time period to not rotate optical polarization of the laser beam. An optical amplification loop is positioned to receive the laser beam.

The optical amplification loop amplifies the received laser beam during the first time period and the second time period. A second polarization rotator is operated during a third time period in order to rotate the optical polarization of the amplified laser beam so that the laser beam is ejected from the loop in order to provide the output pulse.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE INVENTION

Figure 1:
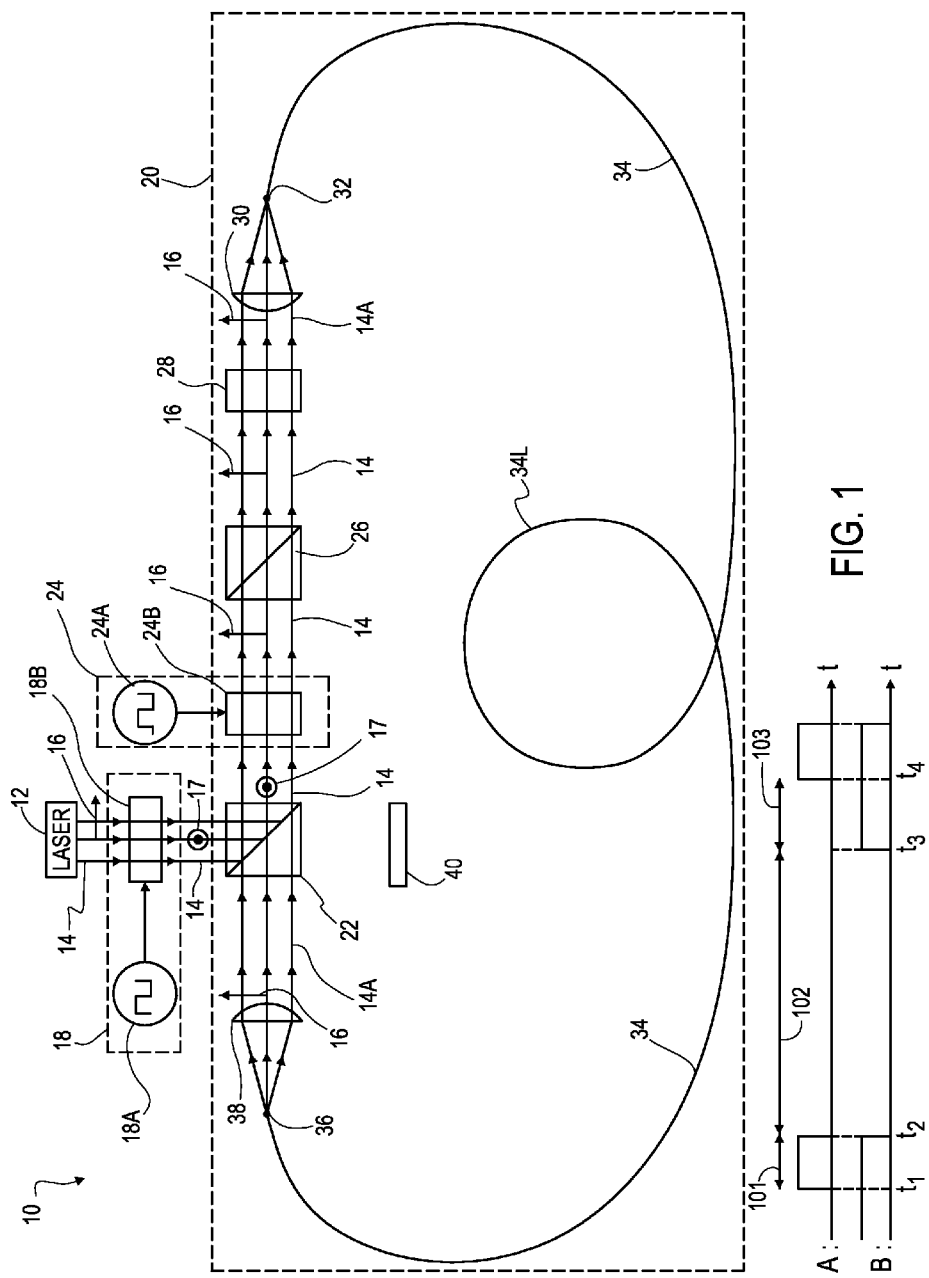
FIG. 1 depicts a schematic of a system for generating coherent single-frequency, single transverse mode light pulses in accordance with an embodiment of the present invention where the system is shown as the system would be configured during a first time period.
Figure 2:
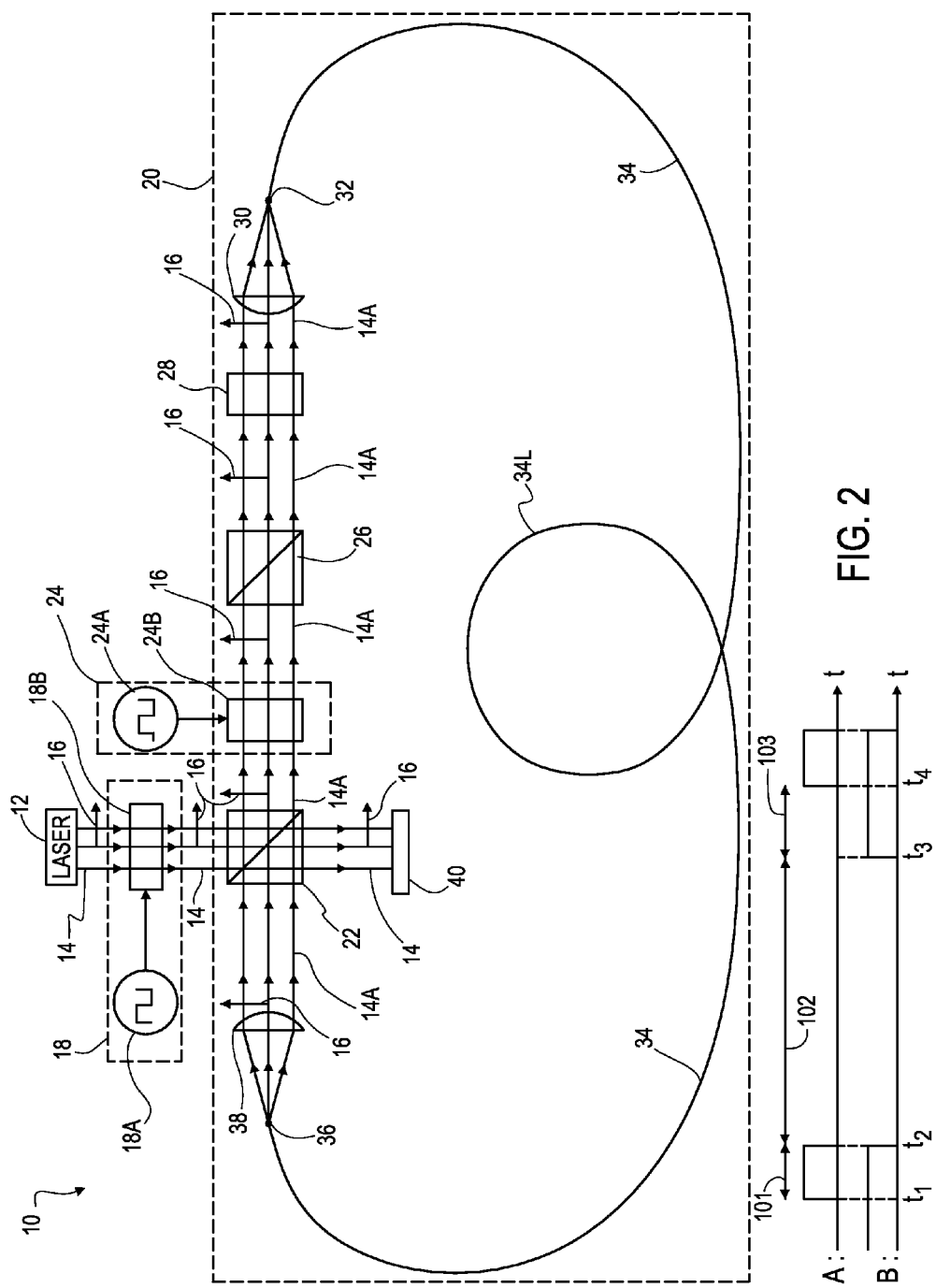
FIG. 2 is a schematic of the system as the system would be configured during a second time period.
Figure 3:
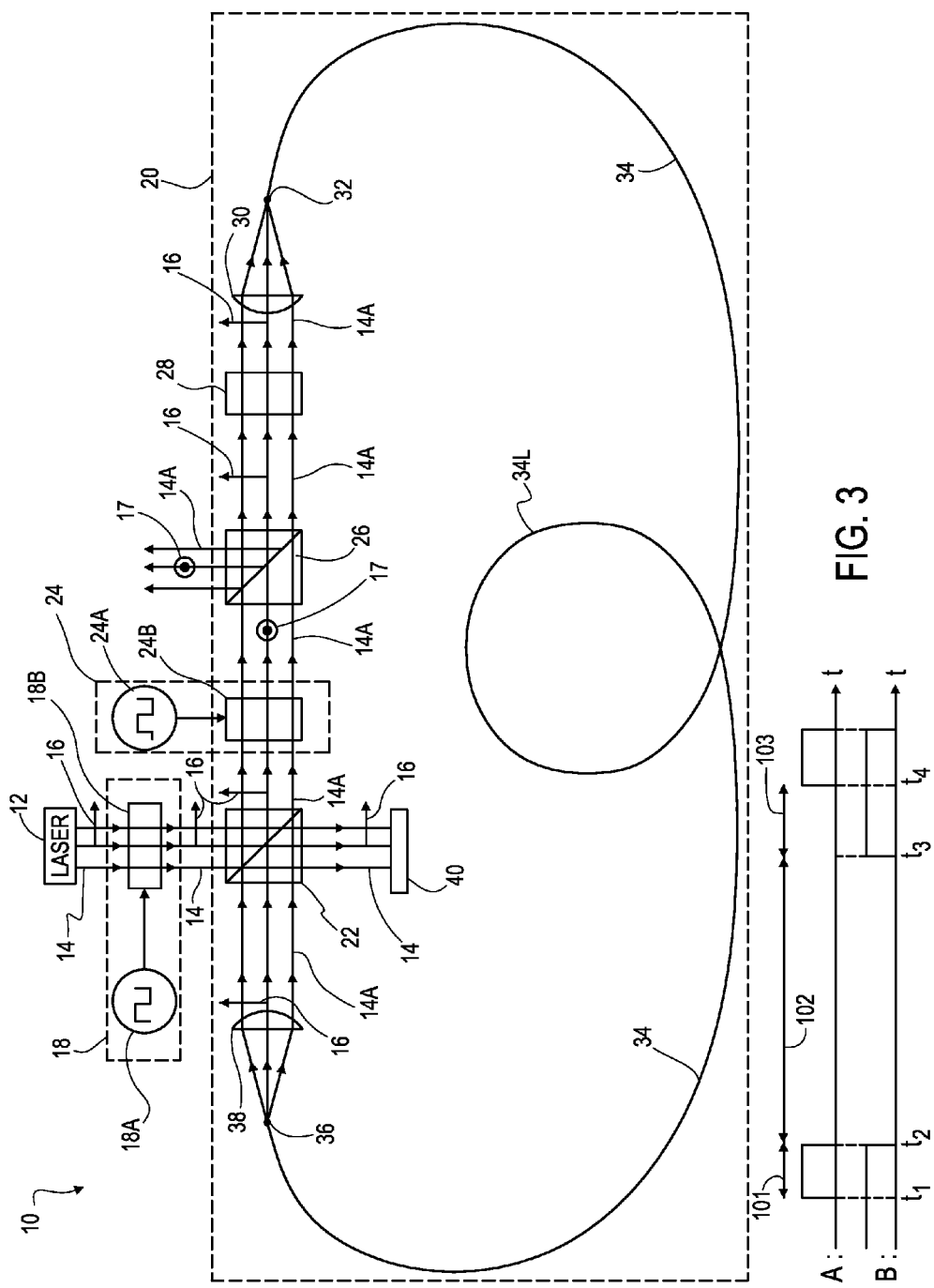
FIG. 3 is a schematic of the system as the system would be configured during a third time period.

Referring now to the drawings, FIGS. 1-3 depict an optical system for generating coherent single-frequency, single transverse mode light pulses that is referenced generally in each figure as item 10. Each of FIGS. 1-3 illustrates the optical configuration of the system 10 during one of three different time periods indicated on the timing diagrams A and B presented with each figure. While the physical structure of system 10 is the same for the three time periods, FIG. 1 illustrates the optical configuration of the system from time $t_1$ to $t_2$ that will be referred to hereinafter as time period 101; FIG. 2 illustrates the optical configuration of the system 10 from time $t_2$ to $t_3$ that will be referred to hereinafter as time period 102. FIG. 3 illustrates the optical configuration of the system 10 during time $t_3$ to $t_4$ that will be referred to hereinafter as time period 103. At time $t_4$, the timing diagrams repeat. That is, the time periods 101-103 are periodic.

Referring to FIG. 1, a continuous-wave, single-longitudinal mode and single transverse mode laser 12 produces a collimated, continuous-wave laser beam as referenced by arrows 14. The laser beam 14 is linearly polarized with a possible direction of polarization indicated by arrow 16. The laser beam 14 is passed through a polarization rotator 18 that can be operated either to preserve or rotate the linear polarization of the laser beam.

The rotator 18 typically includes an electrical signal generator 18A and a controllable optical element 18B (e.g., a Pockels cell, a Kerr cell, etc.) where the optical element preserves or rotates the polarization of the laser beam 14 based on the electrical signal (e.g., voltage) received from the generator. In the use of the rotator 18 in the present embodiment, the operation is to turn a laser beam "on and off". The rotator 18 provides a "fast switch" and optimal synchronization with other components of the system 10. Other components, known in the art, such as acousto-optic modulators and mechanical shutters may be possible alternatives for use in regard to the modulator 18; however if used, the laser output polarization would have to be changed separately.

In terms of the time period 101, the electrical signal generator 18A applies a voltage (pulse) to the optical element 18B that causes polarization rotation of the laser beam 14. Timing diagram A illustrates the voltage output of the signal generator 18A.

With the optical element 18B energized during the time period 101, the polarization of the laser beam 14 is rotated to be perpendicular to the polarization direction 16 as indicated at direction 17. The laser beam 14 in the polarization direction 17 is presented to an optical amplification loop 20. In general, the amplification loop 20 includes a number of optical elements that circulate and amplify that portion of the laser beam 14 presented to the loop during the time period 101. Ejection or redirection of the laser beam 14 from the loop will be explained below in regard to time period 103.

The laser beam 14 enters the amplification loop 20 via a beam splitter 22 that is configured to pass the laser beam in the polarization direction 16, but deflects the laser beam in the polarization direction 17 towards a polarization rotator 24. Similar to the rotator 18, the rotator 24 includes a signal generator 24A and a controllable optical element 24B (e.g., a Pockels cell, a Kerr cell, etc.). During the time period 101, the signal generator 24A applies a voltage (pulse) to the element 24B that causes polarization rotation of the laser beam.

Timing diagram B illustrates the voltage output of the signal generator 24A. With the optical element 24B energized during the time period 101; the polarization of the laser beam 14 in the polarization direction 17 is rotated to the polarization direction 16 for presentation to another beam splitter 26.

The beam splitter 26 is configured to pass the laser beam 14 in the polarization direction 16. Next, a light amplifier 28 amplifies the beam to generate an amplified beam 14A in the polarization direction 16. A lens 30 converges the amplified beam and focuses the beam to an input 32 of a single mode polarization preserving optical fiber 34 that can contain the amplified beam generated during the time period 101. This condition avoids coherent interactions of the amplified front edge of the pulse with other segments of the pulse that could alter the frequency of the pulse in the fiber 34.

Along its length, the fiber 34 can be formed into one or more loops 34L to facilitate space considerations for the system 10. It is also known in the art that the fiber 34 can also act as an amplifier so that the amplifier 28 is not always needed. The amplified beam contained within the fiber 34 exits from an optical end 36 to produce a diverging beam output that is then re-collimated by a lens 38 from which amplified beam 14A (in the polarization direction 16) emerges.

The optical length of the optical amplification loop 20 is such that the emergence of the amplified beam 14A in the direction 16 from the lens 38 occurs after the conclusion of the time period 101. In other words, the time period 101 must be less than the time needed for the light to travel completely around the loop 20 (i.e., the round or loop trip travel time).

The explanation of the operation of the system 10 will continue now with reference to FIG. 2 where the optical configuration of the system 10 during the time period 102 is illustrated. During the time period 102, the signal generators 18A and 24A output a "zero" pulse as shown respectively in timing diagrams A and B. Accordingly, the optical elements 18B and 24B will not rotate polarization of a beam presented thereto.

As mentioned above, the beam splitter 22 is configured to pass light in the polarization direction 16. Therefore, the laser beam 14 in the polarization direction 16 emerging from the rotator 18 during the time period 102 will pass through the beam splitter 22 for absorption by a light absorber 40. At the same time, the amplified beam 14A (in the polarization direction 16) emerging from the lens 38 will also pass through the beam splitter 22 for presentation to the rotator 24. Since the rotator 24 is configured such that the rotator will not rotate polarization; the beam 14A in the polarization direction 16 is maintained. The amplified beam 14A is then passed through beam splitter 26 for further amplification at amplifier 28 and further passage through lens 30, fiber 34 and lens 38. This loop is repeated during the time period 102 which is designed/selected to provide the desired amount of beam amplification.

At the conclusion of the time period 102, the time period 103 begins. The resulting configuration and operation of the system 10 during the time period 103 is explained with the aid of FIG. 3. During the time period 103, the signal generator 18A is maintained at a zero voltage (i.e., a "no polarization" rotation voltage) while the signal generator 24A again outputs a voltage that will bring about polarization rotation at the optical element 24B. The time $t_3$ is adjusted to coincide with the beginning of the pulse exiting at the lens 38 after the desired number of propagation loops through the amplification loop 34.

The corresponding signal voltages are illustrated in respective timing diagrams A and B. Accordingly, the laser beam 14 in the polarization direction 16 is maintained through the beam splitter 22 and is passed to a light absorber 40 as was the case in the time period 102. However the amplified beam 14A in the polarization direction 16 is rotated by the rotator 24 such that the amplified beam in the polarization direction 17 emerges from the rotator 24 and is presented to the beam splitter 26.

While the beam splitter 26 is configured to pass light in the polarization direction 16, the beam splitter 26 is configured to deflect light in the polarization direction 17 out of the optical amplification loop 20. That is, during the time period 103, the amplified beam 14A in the polarization direction 17 is the output beam of the system 10. This condition is maintained by the optical element 24B until after the next pulse enters the amplification loop 20 (i.e., during the first time period 101) so that no resonant modes of the loop can build up a laser oscillation. At the conclusion of the time period 103, the above-described process is repeated to produce another amplified laser pulse.

The advantages of the present invention are numerous. The laser output frequency of the system is equal to the stable seed laser frequency. The polarization of the output is linear in the polarization direction 17. The seed laser can efficiently excite the polarization preserving single transverse mode of the fiber; thereby, ensuring the spatial coherence of the output beam. The recycling of the pulse allows the same amplifier to be used to achieve the desired pulse powers. The time $t_4$ is chosen so as to achieve the desired output pulse repetition rate and to allow for the re-excitation of the amplifier 28. The use of an optical fiber to implement the delay (required to avoid coherent interaction between the amplified front edge of a pulse and a later portion of the pulse and to thereby avoid a frequency shift to the nearest cavity mode) allows the delay to be implemented using a number of fiber loops so that a large delay can be achieved within a compact space.

Another advantage is that temporal shape and time delays between pulses are accomplished by modulating the continuous-wave output of the stable low-power laser; thereby, allowing great flexibility in the shapes and time delays in the sequence of amplified pulses that appear at the output.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A system for generating coherent single-frequency and single transverse mode light pulses, said system comprising:
    a laser capable of producing a linearly-polarized continuous wave laser beam as defined by a single longitudinal mode and a single transverse mode;
    a first polarization rotator positioned to receive and process the laser beam with said first polarization rotator operable during a first time period to rotate optical polarization of the laser beam, and with said first polarization rotator operable during a second and third time period to not rotate optical polarization of the laser beam;
    a second polarization rotator positioned to receive and process the laser beam from said first polarization rotator with said second polarization rotator operable during the first time period to rotate optical polarization of the laser beam, and with said second polarization rotator operable during the second period to not rotate optical polarization of the laser beam, and further with said second polarization rotator operable during the third period to rotate optical polarization of the laser beam; and
    an optical amplification loop positioned to receive the laser beam emitted from said first polarization rotator and said second polarization rotator, said optical amplification loop capable of amplifying the laser beam received during the first and second time periods;
    wherein said optical amplification loop includes an optical fiber loop amplifier positioned within said amplification loop;
    wherein each of said first and second polarization rotators includes an electrically-controllable element selected from the group consisting of a Pockels cell and a Kerr cell.

2. A system as in claim 1, wherein said system further comprises:
    a first beam splitter positioned in said amplification loop between said first and second rotators wherein said first beam splitter is capable of allowing the laser beam to enter said amplification loop; and
    a second beam splitter positioned in said amplification loop between said second rotator and said amplifier wherein said second beam splitter is capable of directing the laser beam processed by said first and second polarization rotators along said optical amplification loop during the first and second time periods and configured to eject the laser beam processed by said first and second polarization rotators out of said optical amplification loop during the third time period in order to obtain an output pulse.

* * * * *